US012172081B2

(12) United States Patent
Saeedi et al.

(10) Patent No.: US 12,172,081 B2
(45) Date of Patent: Dec. 24, 2024

(54) DETECTING PERSONAL-SPACE VIOLATIONS IN ARTIFICIAL INTELLIGENCE BASED NON-PLAYER CHARACTERS

(71) Applicants: Advanced Micro Devices, Inc., Santa Clara, CA (US); ATI Technologies ULC, Markham (CA)

(72) Inventors: Mehdi Saeedi, Markham (CA); Ian Charles Colbert, San Diego, CA (US); Thomas Daniel Perry, Bellevue, WA (US); Gabor Sines, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 109 days.

(21) Appl. No.: 17/709,904

(22) Filed: Mar. 31, 2022

(65) Prior Publication Data
US 2023/0310995 A1  Oct. 5, 2023

(51) Int. Cl.
*A63F 13/56* (2014.01)
(52) U.S. Cl.
CPC .................................. *A63F 13/56* (2014.09)
(58) Field of Classification Search
CPC ........ A63F 13/56; A63F 13/57; A63F 13/573; A63F 13/577; A63F 13/58; A63F 13/60; A63F 13/67; A63F 13/69
See application file for complete search history.

(56) References Cited

U.S. PATENT DOCUMENTS

| | | | | |
|---|---|---|---|---|
| 5,261,820 A | * | 11/1993 | Slye .................... | G09B 19/0053 434/128 |
| 5,287,446 A | * | 2/1994 | Williams ............ | G06F 3/04845 345/474 |
| 5,616,031 A | * | 4/1997 | Logg .................... | A63F 13/5255 434/33 |

(Continued)

OTHER PUBLICATIONS

De Pontes Pereira et al., "A Framework for Constrained and Adaptive Behavior-Based Agents", Jun. 7, 2015, 16 pages, https://arxiv.org/pdf/1506.02312.pdf. [Retrieved Jul. 13, 2021].

(Continued)

*Primary Examiner* — David L Lewis
*Assistant Examiner* — Matthew D Hoel
(74) *Attorney, Agent, or Firm* — Kowert, Hood, Munyon, Rankin & Goetzel, P.C.; Rory D. Rankin

(57) ABSTRACT

Systems, apparatuses, and methods for detecting personal-space violations in artificial intelligence (AI) based non-player characters (NPCs) are disclosed. An AI engine creates a NPC that accompanies and/or interacts with a player controlled by a user playing a video game. During gameplay, measures of context-dependent personal space around the player and/or one or more NPCs are generated. A control circuit monitors the movements of the NPC during gameplay and determines whether the NPC is adhering to or violating the measures of context-dependent personal space. The control circuit can monitor the movements of multiple NPCs simultaneously during gameplay, keeping a separate score for each NPC. After some amount of time has elapsed, the scores of the NPCs are recorded, and then the scores are provided to a machine learning engine to retrain the AI engines controlling the NPCs.

20 Claims, 10 Drawing Sheets

(56) References Cited

U.S. PATENT DOCUMENTS

| | | | | |
|---|---|---|---|---|
| 6,196,917 B1* | 3/2001 | Mathias | A63F 13/812 | 463/2 |
| 6,293,798 B1* | 9/2001 | Boyle | G09B 9/048 | 434/62 |
| 9,421,461 B2* | 8/2016 | Edsall | A63F 13/577 | |
| 9,586,145 B2* | 3/2017 | DeYoung | A63F 13/20 | |
| 9,737,817 B1* | 8/2017 | Ricky | A63B 60/42 | |
| 9,919,213 B2* | 3/2018 | Dunn | A63F 13/837 | |
| 10,004,991 B2* | 6/2018 | Ceraldi | A63F 13/86 | |
| 10,010,791 B2* | 7/2018 | Ceraldi | A63F 13/798 | |
| 10,156,970 B2* | 12/2018 | We | G06F 3/0481 | |
| 10,207,189 B1* | 2/2019 | Gauffin | A63F 13/79 | |
| 10,249,140 B1* | 4/2019 | Gauffin | G07F 17/3241 | |
| 10,272,341 B1* | 4/2019 | Blackwell | A63F 13/67 | |
| 10,549,189 B1* | 2/2020 | Yong | A63F 13/358 | |
| 10,576,380 B1* | 3/2020 | Beltran | A63F 13/65 | |
| 10,860,860 B1* | 12/2020 | Huynh | G06F 16/739 | |
| 10,918,941 B2* | 2/2021 | Kolen | A63F 13/79 | |
| 11,029,947 B2* | 6/2021 | Jayaraman | G06N 3/08 | |
| 11,042,472 B2* | 6/2021 | Vidal | G06F 11/3684 | |
| 11,068,284 B2* | 7/2021 | Gauffin | G09B 9/052 | |
| 11,090,565 B2* | 8/2021 | Vennam | A63F 13/47 | |
| 11,247,124 B2* | 2/2022 | Ota | H04L 43/0884 | |
| 11,291,917 B2* | 4/2022 | Beltran | A63F 13/77 | |
| 11,291,919 B2* | 4/2022 | Ma | G06N 5/04 | |
| 11,318,373 B2* | 5/2022 | Charette | A63F 13/533 | |
| 11,544,594 B2* | 1/2023 | Woo | G06N 5/04 | |
| 11,623,145 B1* | 4/2023 | Pineda | A63F 13/5252 | 463/31 |
| 11,666,830 B2* | 6/2023 | McCoy | A63F 13/70 | 463/31 |
| 11,741,358 B2* | 8/2023 | Zhao | G06N 3/045 | 706/21 |
| 2002/0115483 A1* | 8/2002 | Fujiwara | A63F 13/45 | 463/7 |
| 2005/0071306 A1* | 3/2005 | Kruszewski | A63F 13/10 | 345/473 |
| 2009/0311652 A1* | 12/2009 | Langridge | A63F 13/837 | 434/11 |
| 2010/0004861 A1* | 1/2010 | Park | G06V 20/36 | 901/1 |
| 2010/0009733 A1* | 1/2010 | Garvin | A63F 13/10 | 463/37 |
| 2010/0009734 A1* | 1/2010 | Sambongi | A63F 13/422 | 463/5 |
| 2010/0013836 A1* | 1/2010 | Kang | G11B 27/105 | 345/473 |
| 2010/0015579 A1* | 1/2010 | Schlabach | G06N 5/04 | 434/11 |
| 2010/0146085 A1* | 6/2010 | Van Wie | H04L 65/764 | 709/224 |
| 2010/0315505 A1* | 12/2010 | Michalke | G06T 7/251 | 348/118 |
| 2011/0009241 A1* | 1/2011 | Lane | G06F 3/011 | 482/8 |
| 2011/0039618 A1* | 2/2011 | Ichiyanagi | A63F 13/837 | 463/31 |
| 2011/0077080 A1* | 3/2011 | Meer | A63F 13/424 | 463/32 |
| 2011/0244957 A1* | 10/2011 | Nishimura | A63F 13/837 | 463/31 |
| 2011/0269540 A1* | 11/2011 | Gillo | A63F 13/34 | 463/31 |
| 2012/0206577 A1* | 8/2012 | Guckenberger | G09B 19/003 | 348/47 |
| 2013/0083036 A1* | 4/2013 | Cario | A63F 13/45 | 345/473 |
| 2013/0178980 A1* | 7/2013 | Chemouny | B25J 9/1671 | 700/255 |
| 2013/0282444 A1* | 10/2013 | Karlsson | G06Q 30/0243 | 705/7.37 |
| 2013/0293362 A1* | 11/2013 | Parazynski | G06F 3/0338 | 340/12.52 |
| 2013/0316839 A1* | 11/2013 | Woo | A63F 13/213 | 473/156 |
| 2014/0256447 A1* | 9/2014 | Woodman | A63F 13/44 | 463/42 |
| 2015/0182854 A1* | 7/2015 | Edsall | A63F 13/422 | 463/31 |
| 2015/0261647 A1* | 9/2015 | Sakaki | G06Q 10/0637 | 703/21 |
| 2015/0293668 A1* | 10/2015 | Kurabayashi | G06F 3/04842 | 463/31 |
| 2016/0143075 A1* | 5/2016 | Tucker | H04L 63/0823 | 370/329 |
| 2017/0160706 A1* | 6/2017 | Düll | G05B 13/042 | |
| 2017/0221484 A1* | 8/2017 | Poltorak | G10L 15/142 | |
| 2017/0246544 A1* | 8/2017 | Agarwal | A63F 13/63 | |
| 2017/0282063 A1* | 10/2017 | Krishnamurthy | A63F 13/69 | |
| 2017/0312626 A1* | 11/2017 | Colenbrander | H04L 67/10 | |
| 2017/0357910 A1* | 12/2017 | Sommer | G06F 9/54 | |
| 2018/0001205 A1* | 1/2018 | Osman | A63F 13/5375 | |
| 2018/0001206 A1* | 1/2018 | Osman | A63F 13/798 | |
| 2018/0018590 A1* | 1/2018 | Szeto | G16H 50/20 | |
| 2018/0053433 A1* | 2/2018 | Dunn | G09B 7/00 | |
| 2018/0139257 A1* | 5/2018 | Ninoles | H04L 65/1089 | |
| 2018/0204476 A1* | 7/2018 | Laverty | G09B 5/06 | |
| 2018/0243656 A1* | 8/2018 | Aghdaie | A63F 13/67 | |
| 2018/0318719 A1* | 11/2018 | Ma | G06N 3/006 | |
| 2019/0005428 A1* | 1/2019 | Kras | G06Q 10/06314 | |
| 2019/0012602 A1* | 1/2019 | Mishra | H04L 67/63 | |
| 2019/0028499 A1* | 1/2019 | Cidon | G06N 5/04 | |
| 2019/0076731 A1* | 3/2019 | Hickman | G06F 16/51 | |
| 2019/0108768 A1* | 4/2019 | Mohamed | G09B 9/052 | |
| 2019/0197402 A1* | 6/2019 | Kovács | A63F 13/60 | |
| 2019/0251603 A1* | 8/2019 | Jaatinen | G06N 3/006 | |
| 2019/0318202 A1* | 10/2019 | Zhao | G06F 18/214 | |
| 2019/0318254 A1* | 10/2019 | Lobete | G06N 3/006 | |
| 2019/0318267 A1* | 10/2019 | Zhang | G06N 20/00 | |
| 2019/0321727 A1* | 10/2019 | Rodgers | A63F 13/335 | |
| 2019/0388787 A1* | 12/2019 | Padmanabhan | A63F 13/47 | |
| 2020/0030702 A1* | 1/2020 | Benedetto | A63F 13/847 | |
| 2020/0197815 A1* | 6/2020 | Beltran | A63F 13/77 | |
| 2020/0282297 A1* | 9/2020 | Mehta | A63F 3/00643 | |
| 2020/0289943 A1* | 9/2020 | Rico | A63F 13/795 | |
| 2021/0031115 A1* | 2/2021 | McCoy | A63F 13/67 | |
| 2022/0193549 A1* | 6/2022 | Wakeland | G06N 3/08 | |
| 2022/0219087 A1* | 7/2022 | Beltran | A63F 13/44 | |
| 2022/0309364 A1* | 9/2022 | Perry | A63F 13/56 | |
| 2023/0267668 A1* | 8/2023 | Starke | A63F 13/52 | 345/473 |

OTHER PUBLICATIONS

Fu et al., "A Reinforcement Learning Behavior Tree Framework for Game AI", 2nd International Conference on Economics, Social Science, Arts, Education and Management Engineering (ESSAEME 2016), Aug. 2016, pp. 573-579, Atlantis Press, https://www.atlantis-press.com/proceedings/essaeme-16/25860289. [Retrieved Jul. 13, 2021].

Parr et al., "Reinforcement Learning with Hierarchies of Machines", NIPS '97: Proceedings of the 1997 conference on Advances in neural information processing systems 10, Jul. 1998, pp. 1043-1049, MIT Press, https://proceedings.neurips.cc/paper/1997/file/5ca3e9b122f61f8f06494c97b1afccf3-Paper.pdf. [Retrieved Jul. 13, 2021].

Taylor III, Allen, "HQ-DoG: Hierarchical Q-Learning in Domination Games", Master's Thesis, Aug. 2012, 95 pages, https://ai.uga.edu/sites/default/files/inline-files/taylor_allen_201208_ms.pdf. [Retrieved Jul. 13, 2021].

Zhang et al., "Learning Behavior Trees for Autonomous Agents with Hybrid Constraints Evolution", Applied Sciences 8, No. 7, 1077, Jul. 3, 2018, 22 pages, https://www.mdpi.com/2076-3417/8/7/1077. [Retrieved Jul. 13, 2021].

Perry et al., U.S. Appl. No. 17/215,437, entitled "Human-Like Non-Player Character Behavior With Reinforcement Learning", filed Mar. 29, 2021, 47 pages.

(56) References Cited

OTHER PUBLICATIONS

"Dehesa, et al., Touche: Data-Driven Interactive Sword Fighting in Virtual Reality, CHI '20: Proceedings of the 2020 CHI Conferenceon Human Factors in Computing Systems, Apr. 25-30, 2020, pp. 1-15 (Year: 2020)", 14 pgs.

"Lee, et al., Precomputing Avatar Behavior From Human Motion Data, Graphical Models, vol. 68, Issue 2, Mar. 2006, pp. 158-174 (Year: 2006)", 17 pgs.

"Kerzel, et al., Teaching NICO How to Grasp: An Empirical Study on Crossmodal Social Interaction as a Key Factor for RobotsLearning From Humans, Frontiers in Neurorobotics, vol. 14, Jun. 9, 2020, pp. 1-22 (Year: 2020)", 22 pgs.

* cited by examiner

DETECTING PERSONAL-SPACE VIOLATIONS IN ARTIFICIAL INTELLIGENCE BASED NON-PLAYER CHARACTERS

BACKGROUND

Description of the Related Art

Video games regularly face the challenge of generating realistic non-player characters (NPCs). For example, video games can include companion NPCs accompanying the player controlled by the user, enemy NPCs, and other types of NPCs. Various techniques can be used to generate a path route for each NPC. For example, in one scenario, a route can be generated using a mesh-based graph such as a navigation mesh. A navigation mesh is a data structure which models areas of a virtual map that are traversable by an NPC. The navigation mesh allows NPCs to find traversable paths through complex environments. A navigation mesh can also be referred to herein as a "NavMesh".

Modern games often include multiple NPCs where several of them usually appear at the same time in a scene. In such scenarios, the NPCs need to keep their distance from each other and not move into each other or the player. The NavMesh method can be used to program NPCs, where each NPC uses a predefined path to navigate. When there are many NPCs, in order to simplify the game development, many of them share the same NavMesh surface. In such cases, if NPCs' paths have overlapped, these NPCs can hit each other during the gameplay which is not interesting. This kind of problem happens often in today's games.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for detecting personal-space violations in artificial intelligence (AI)-based non-player characters (NPCs) are disclosed herein. AI engines create one or more NPCs that accompany and/or interact with a player. Depending on the embodiment, the player can be controlled by a user playing a video game or the player can be controlled by an agent trained to play the video game. In one implementation, during gameplay, measures of context-dependent personal space around the player and/or one or more NPCs are generated. A control circuit monitors the movements of each NPC during gameplay and determines whether the NPC is adhering to or violating the measures of context-dependent personal space. The control circuit can monitor the movements of multiple NPCs simultaneously during gameplay, keeping a separate score for each NPC. After some amount of time has elapsed, the scores of the NPCs are recorded, and then the scores are provided to a machine learning engine to retrain the AI engines controlling the NPCs.

Figure 1:
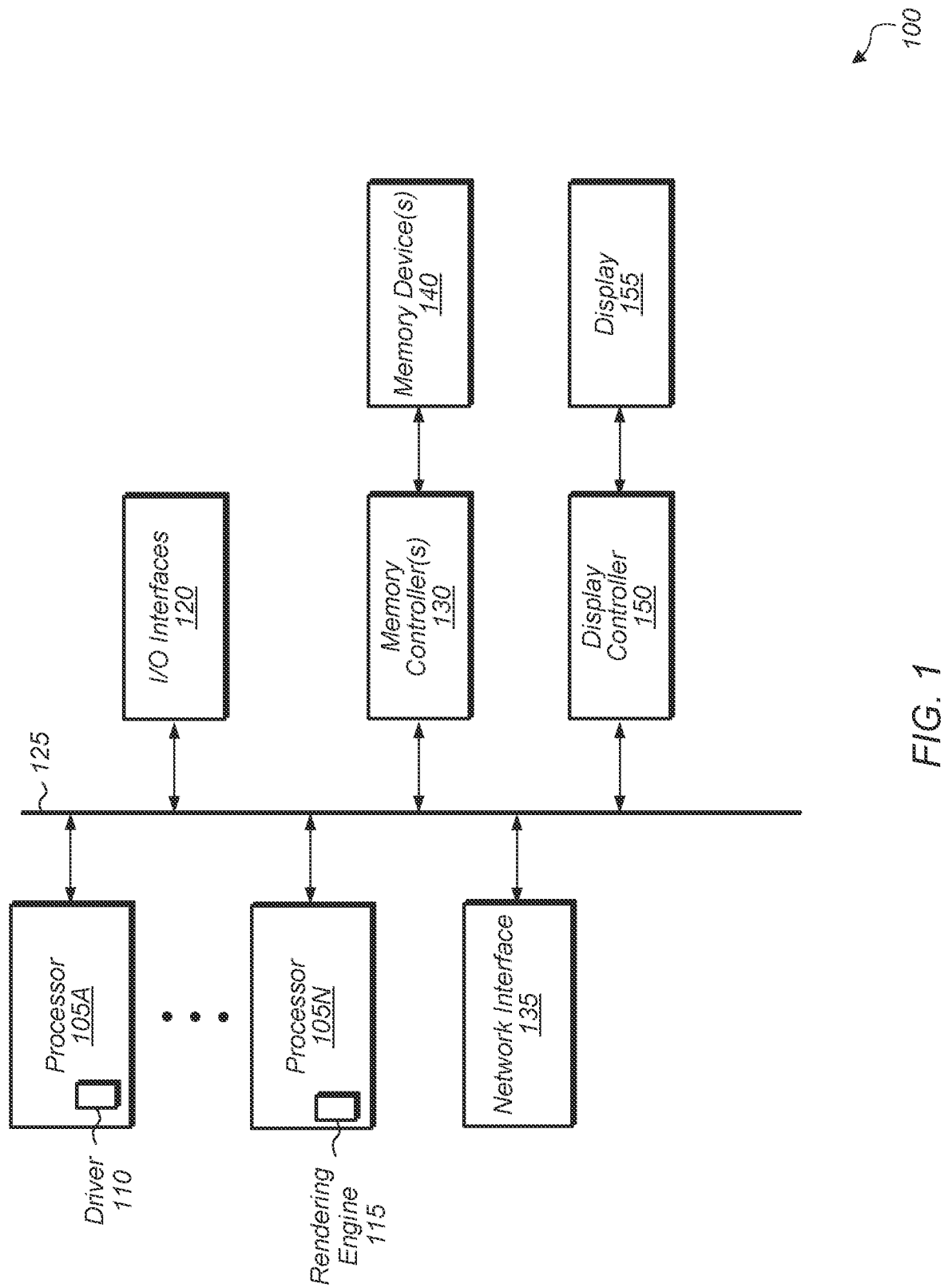
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general-purpose processor, such as a central processing unit (CPU). In this implementation, processor 105A executes a driver 110 (e.g., graphics driver) for communicating with and/or controlling the operation of one or more of the other processors in system 100. In one implementation, processor 105N is a data parallel processor with a highly parallel architecture, such as a dedicated neural network accelerator or a graphics processing unit (GPU) which provides pixels to display controller 150 to be driven to display 155.

A GPU is a complex integrated circuit that performs graphics-processing tasks. For example, a GPU executes graphics-processing tasks required by an end-user application, such as a video-game application. GPUs are also increasingly being used to perform other tasks which are unrelated to graphics. The GPU can be a discrete device or can be included in the same device as another processor, such as a CPU. Other data parallel processors that can be included in system 100 include digital signal processors (DSPs), field programmable gate arrays (FPGAs), application specific integrated circuits (ASICs), and so forth. In some implementations, processors 105A-N include multiple data parallel processors.

An emerging technology field is machine learning, with a neural network being one type of a machine learning model. Neural networks have demonstrated excellent performance at tasks such as hand-written digit classification and face detection. Other applications for neural networks include speech recognition, language modeling, sentiment analysis, text prediction, and others. In one implementation, processor 105N is a data parallel processor programmed to execute one or more neural network applications to implement movement schemes for one or more non-player characters (NPCs) as part of a video-game application. In this implementation, the movement scheme for each NPC is designed to avoid violating the personal space of a user-controlled player and/or the personal space of any other NPC.

In one implementation, imitation learning is used to generate a movement scheme for an NPC. In this implementation, the movements of one or more players controlled by user(s) playing a video game application and/or the movements of pre-trained agents are used by a trained neural network which generates a movement scheme of movement controls to apply to an NPC. In another implementation, reinforcement learning (RL) is used to generate the movement scheme for the NPC. Any number of different trained neural networks can control any number of NPCs. The output(s) of the trained neural network(s) of NPC(s) are rendered into a user interface (UI) of the video game application in real-time by rendering engine 115. In one implementation, the trained neural network executes on one or more of processors 105A-N.

As used herein, the term "personal space" is defined as the required distance between two moving objects (e.g., NPCs) in a game. The term "personal space" can also be extended to apply to the required distance between an NPC and a player or an NPC and a pre-recorded player. It is noted that personal space is defined as the space between interacting NPCs or between an NPC and a user-controlled player where close interaction is not required to fulfill the mission of the game. For example, in a situation where there is a fight between two NPCs or between an NPC and the user-controlled player, this fighting action would not be considered as violating personal space. Accordingly, the context of the game also influences whether a personal space violation is deemed as having occurred for scoring purposes.

In one implementation, a separate artificial intelligence (AI) engine controls each NPC. When an NPC violates the measures of personal space generated for the particular video game, the AI engines learn to do better by adjusting parameters or running a full reinforcement learning (RL) training loop to refine the AI engines. In one implementation, a supervised learning model is trained to play a video of a given duration and copy the behavior from the video. In one implementation, the RL training loop is executed in a cloud environment. During the RL training loop, parameters such as delays, angles, and other settings are adjusted while the cloud is refining the neural network so as to improve the AI engine's performance in future gameplay scenarios. When the training of the neural network is complete, the newly trained neural network is downloaded and swapped in at run-time. In various implementations, a video game application implements multi-agent control, with each agent an independent AI engine. In some implementation, the video game application includes collaborative agents. An AI engine can consider this during training and the behavior of the AI engine can be dependent on one or more collaborative agents. In one implementation, the agents are trained through live game play with live updates to the neural networks running the AI engines from a learning server during game play. In another implementation, agents are trained off-line and updates to the game occur during periodic software updates.

Memory controller(s) 130 are representative of any number and type of memory controllers accessible by processors 105A-N. While memory controller(s) 130 are shown as being separate from processors 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, and so forth. Network interface 135 is able to receive and send network messages across a network. Bus 125 is representative of any number and type of interfaces, communication fabric, and/or other connectivity for connecting together the different components of system 100.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
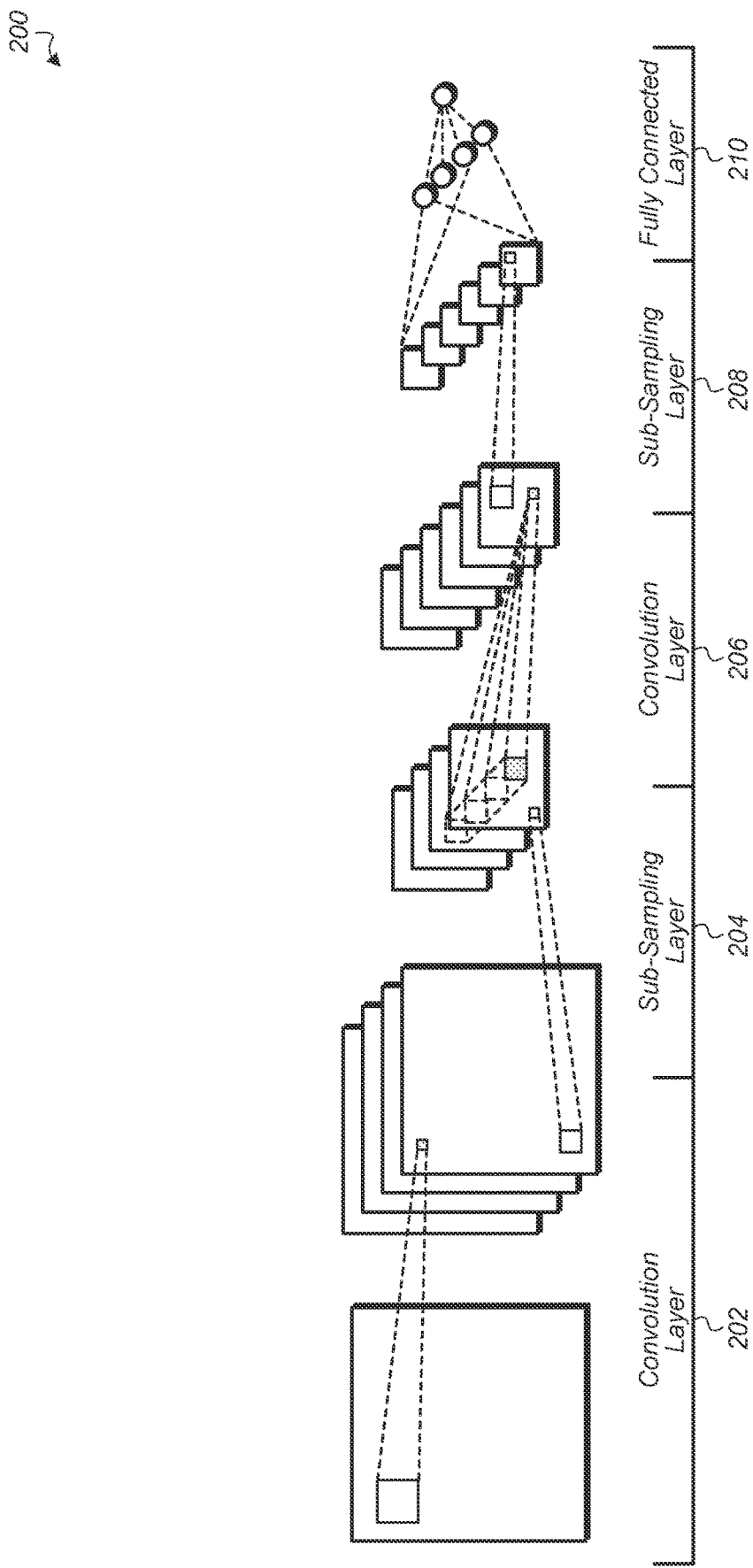
FIG. 2 is a block diagram of one implementation of a portion of a neural network.

Turning now to FIG. 2, a block diagram of one implementation of a portion of a neural network 200 is shown. It is noted that the example of the portion of neural network 200 is merely intended as an example of a neural network that can be trained and used by various video game applications. The example of neural network 200 does not preclude the use of other types of neural networks. The training of a neural network can be performed using reinforcement learning (RL), supervised learning, or imitation learning in various implementations. It is noted that a trained neural network can use convolution, fully connected, long short-term memory (LSTM), gated recurrent unit (GRU), and/or other types of layers. It is also noted that a trained neural network can be made up of modified versions of these layers and/or other types of layers.

The portion of neural network 200 shown in FIG. 2 includes convolution layer 202, sub-sampling layer 204, convolution layer 206, sub-sampling layer 208, and fully connected layer 210. Neural network 200 can include multiple groupings of neurons, connections, activations, or layers that interconnect to create the structure of the network. The other groupings of layers that are part of neural network 200 can include other numbers and arrangements of neurons, connections, activations, or layers than what is shown in FIG. 2. It is noted that layers 202-210 are merely intended as an example of a grouping of layers that can be implemented in back-to-back fashion in one particular embodiment. The arrangement of layers 202-210 shown in FIG. 2 does not preclude other ways of stacking layers together from being used to create other types of neural networks.

When implementing neural network 200 on a computing system (e.g., system 100 of FIG. 1), neural network 200 generates action controls for any number of NPCs associated with a player controlled by a user or an AI engine playing a video game application. The NPCs are then integrated into the video game application. In one implementation, a measure of personal space is generated with respect to the player controlled by the user or AI-engine. A different measure of personal space can also be generated for each NPC with respect to the other NPCs in the game. In one implementation, the measure of personal space is a number of units away from the player, or a number of units away from a given NPC. Also, the measure of personal space can be adjusted based on social cues. For example, depending on the environment being traversed by player, the measure of personal space can be increased or decreased. For example, if the player is riding on an elevator, then the measure of personal space is decreased. This allows an NPC that is accompanying the player to move closer to the player while riding on the elevator. When the player exits the elevator, the measure of personal space can revert back to the original value. For other types of gameplay scenarios, other appropriate adjustments can be made to the measure of personal space.

During gameplay, the actual distance from the NPC to the player is measured. When multiple NPCs are accompanying or interacting with the player, the distance from each NPC to the player is measured per individual NPC or per group of NPCs independently of the other NPCs. Depending on the implementation, the Euclidean distance, the Geodesic distance, the Manhattan distance, or another type of distance is measured between the NPC and the player. This distance is then compared to the measure of personal space, and a score is generated based on whether the NPC is adhering to or violating the measure of personal space. Over some interval of time, the score is accumulated and then a final score is recorded. Depending on the implementation, the score can be accumulated in a variety of different manners. For example, in one implementation, adhering to the measure of personal space corresponds to a positive value while violating the measure of personal space corresponds to a negative value. In this implementation, if the final score has a relatively large positive value, this indicates the NPC followed the player in a graceful, expected manner while if the final score has a relatively large negative value, this indicates the NPC was either too close or too far from the player on multiple occasions. In other implementations, the score can be generated in other appropriate manners.

Based on this final score generated over the interval of time, the NPC is retrained to better adhere to the measure of personal space associated with the player or the measure of personal space associated with a separate NPC. In this way, the movements of each NPC are iteratively tuned to prevent awkward behavior which would detract from the user's video game experience. For example, if a given NPC keeps bumping into the player during gameplay, this would negatively impact the user experience. In this case, the given NPC would have a negative final score and this would cause a given neural network 200 generating actions for the given NPC to be retrained to improve the fluidity of future movements of the given NPC.

Figure 3:
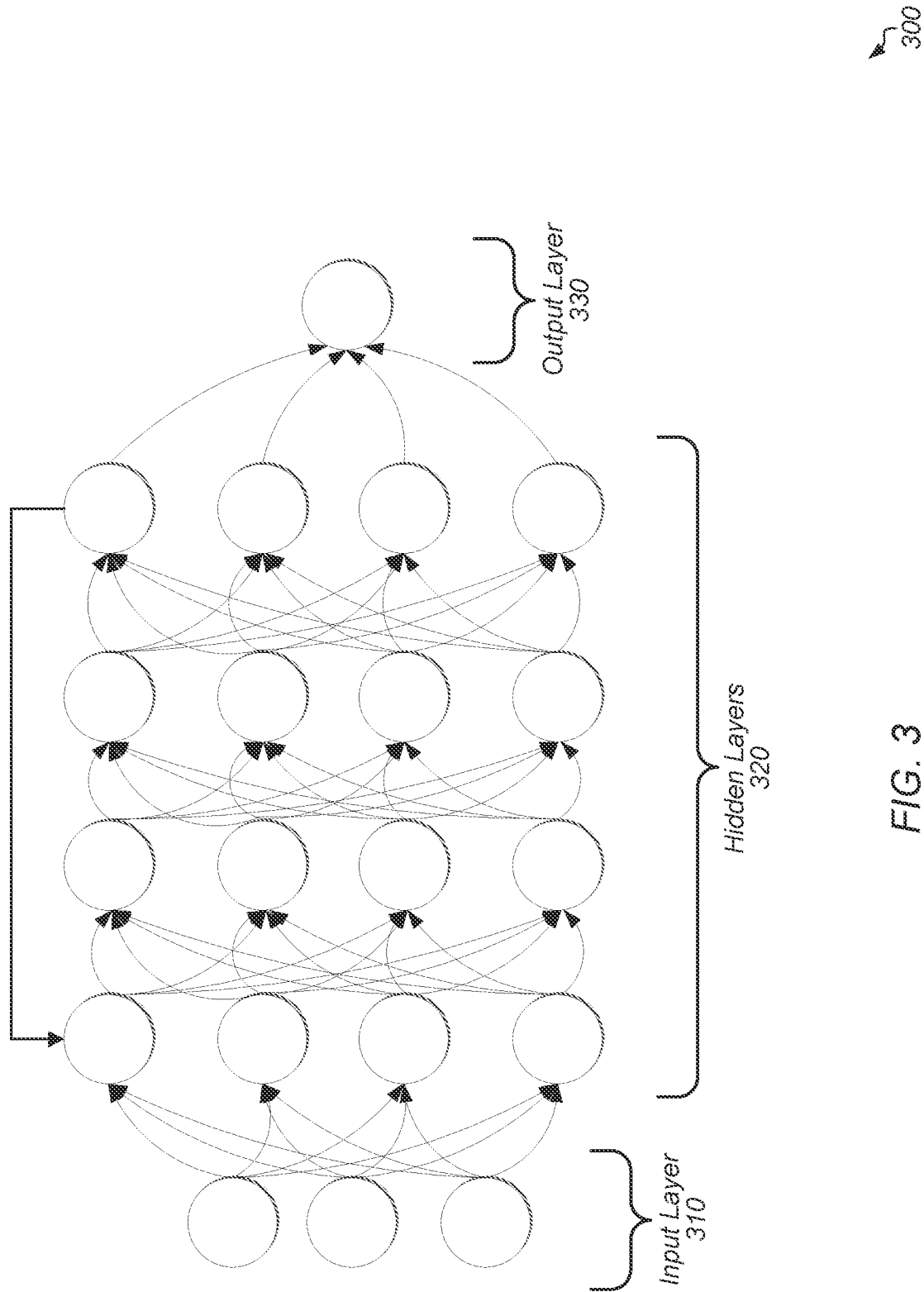
FIG. 3 is a block diagram of another implementation of a neural network.

Referring now to FIG. 3, a block diagram of another implementation of a neural network 300 is shown. Neural network 300 illustrates another example of a neural network that can be implemented on a computing system (e.g., system 100 of FIG. 1). In one implementation, neural network 300 is a recurrent neural network (RNN) and includes at least input layer 310, hidden layers 320, and output layer 330. Hidden layers 320 are representative of any number of hidden layers, with each layer having any number of neurons. Neurons that are used for RNNs include long short-term memory (LSTM), gated recurrent unit (GRU), and others. Also, any number and type of connections between the neurons of the hidden layers may exist. Additionally, the number of backward connections between hidden layers 320 can vary from network to network.

In other implementations, neural network 300 includes other arrangements of layers and/or other connections between layers that are different from what is shown in FIG. 3. In some cases, neural network 300 can include any of the layers of neural network 200 (of FIG. 2). In other words, portions or the entirety of convolutional neural networks (CNNs) can be combined with portions or the entirety of RNNs to create a single neural network. Also, any intermixing of neural network types together can be employed, such as intermixing fully connected and other neural network nodes. Examples of other network topologies that can be used or combined together with other networks include generative-adversarial networks (GANs), attention models, transformer networks, RNN-Transduce networks and their derivatives, and others.

In one implementation, as part of an environment where supervised learning is used to direct reinforcement learning, neural network 300 processes an input dataset to generate result data. In one implementation, the input dataset includes a plurality of movements of an NPC accompanying a player in a video game. In this implementation, the result data indicates how to control the movements of the NPC that will be rendered into the user interface (UI) along with the player. For example, imitation learning can be used in one implementation. In another implementation, the NPC movement data is played back in a reinforcement learning environment so that neural network 300 can adapt and learn based on a replay of the NPC movement. In other implementations, the input dataset and/or the result data includes any of various other types of data.

Figure 4:
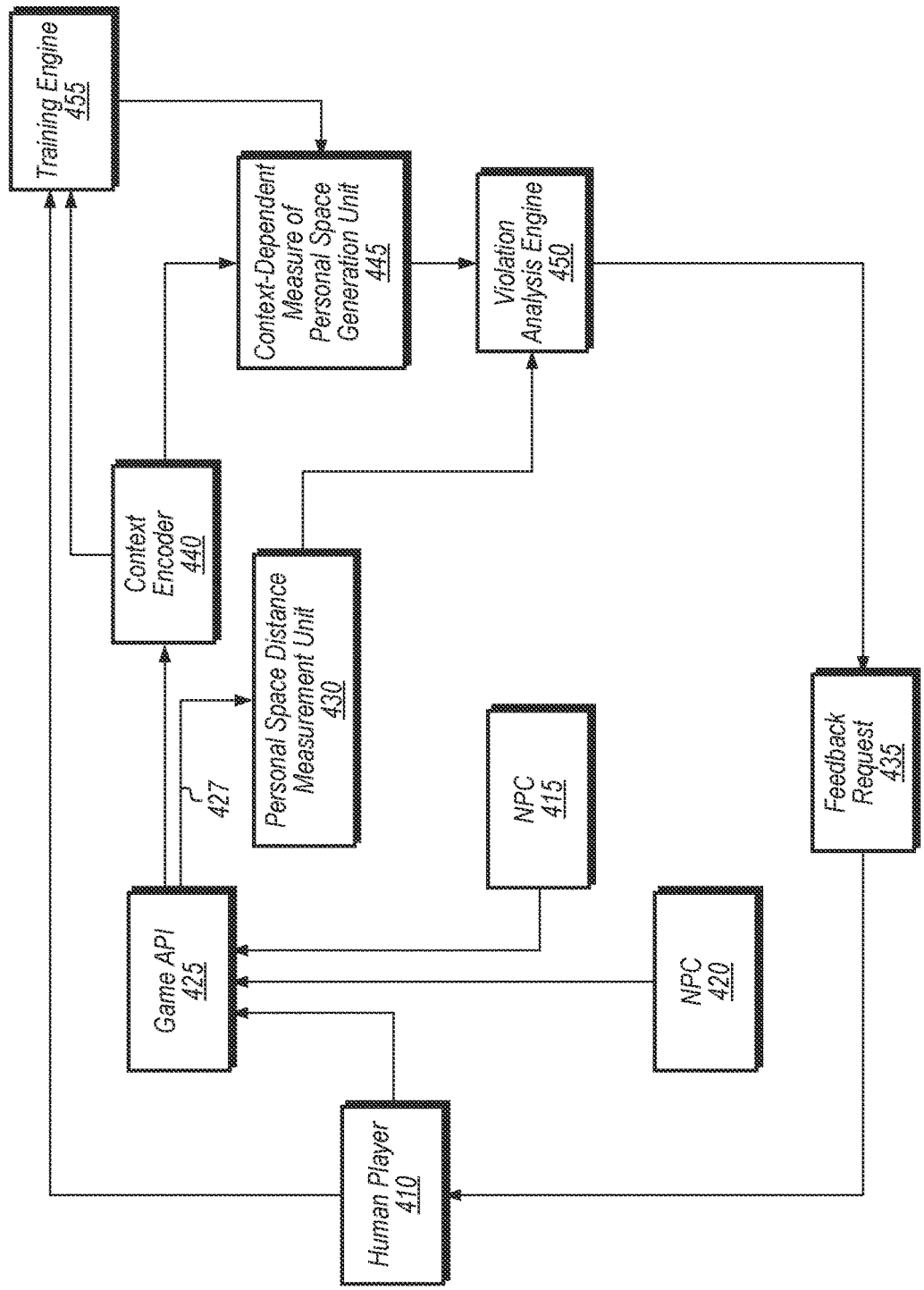
FIG. 4 is a block diagram of one implementation of a system for training NPCs based on detected personal space violations.

Turning now to FIG. 4, a block diagram of one implementation of a system 400 for training NPCs based on detected personal space violations is shown. As shown in FIG. 4, system 400 includes human player 410 playing a given video game. Also, system 400 includes non-playable characters (NPCs) 415 and 420, which are representative of any number and type of NPCs. In one implementation, feedback data is collected from human player 410, with the data indicating whether NPC 415 or NPC 420 is too close or too far from the player or from another NPC. In one implementation, the data collected from human player 410 is encoded as a sparse reward function. For example, in this implementation, −1 is encoded to indicate the agent is too close or too far away from another agent or from the player, while 0 is encoded to indicate that the agent is at an appropriate location with respect to the other entity. In other implementations, other encodings can be used.

In one implementation, personal space distance measurement unit 430 calculates the actual distance between NPCs 415 and 420 and between NPCs 415 and 420 and the main player during gameplay. In this implementation, personal space distance measurement unit 430 receives indications of locations and movements of NPCs 415 and 420 and human player 410 during gameplay on interface 427 via game API 425. Depending on the implementation, the Euclidean distance, the Geodesic distance, the Manhattan distance, or another type of distance is measured between NPCs 415 and 420 and/or between NPC 415 or 420 and the player. Also, context encoder 440 determines the current context of gameplay based on social cues received via game API 425. The current context of gameplay is provided to training engine 455 and context-dependent measure of personal space generation unit 445. Context-dependent measure of personal space generation unit 445 generates the context-specific measure of personal space for the current context of gameplay and provides the context-specific measure of personal space to violation analysis engine 450.

It is noted that personal space distance measurement unit 430, context encoder 440, context-dependent measure of personal space generation unit 445, and violation analysis engine 450 can be referred to herein collectively as a "control circuit". Alternatively, each of personal space distance measurement unit 430, context encoder 440, context-dependent measure of personal space generation unit 445, and violation analysis engine 450 can be referred to herein individually as a "control circuit". Depending on the embodiment, personal space distance measurement unit 430, context encoder 440, context-dependent measure of personal space generation unit 445 and violation analysis engine 450 can be implemented using any suitable combination of circuitry and/or program instructions executable by one or more processors.

Violation analysis engine 450 determines if the distance between agents calculated by personal space distance measurement unit 430 is in compliance with the context-specific measure of personal space generated by context-dependent measure of personal space generation unit 445 for each of these agents. In one implementation, violation analysis engine 450 generates a score based on whether the distance between agents complies with or is within the range defined by the context-specific measure of personal space. The score being a certain value (i.e., less than zero in one implementation) is an indication that a violation has occurred. The score is provided to feedback request unit 435 to determine whether to generate a feedback request to human player 410. Human player 410 can generate confirmation that the action of NPC 415 or NPC 420 was improper or unnatural and caused a disruption in the user experience. In that case, training engine 455 can cause an update to context-dependent measure of personal space generation unit 445 to tune the context-specific measure of personal space for the particular context of gameplay. Alternatively, human player 410 can indicate that the action and/or location of NPC 415 or NPC 420 was not disruptive to the game flow.

In one implementation, feedback data is collected from a variety of human judges about whether NPC 415 or NPC 420 is too close or too far away from another entity (e.g., another NPC, the player). In one implementation, a learned model (e.g., deep learning model, machine learning model, statistics-based model) is continually updated based on the dataset collected from the pool of human judges. The resultant output is integrated into gaming API 425 to guide the personal space metrics. The model can also be fine-tuned using an online learning scheme. It is noted that system 400 can be implemented using any suitable combination of circuitry and program instructions executable by one or more processors. Also, it should be understood that the structure of system 400 as shown in FIG. 4 is merely representative of one particular implementation. In other implementations, system 400 can include other suitable arrangements of components.

Figure 5:
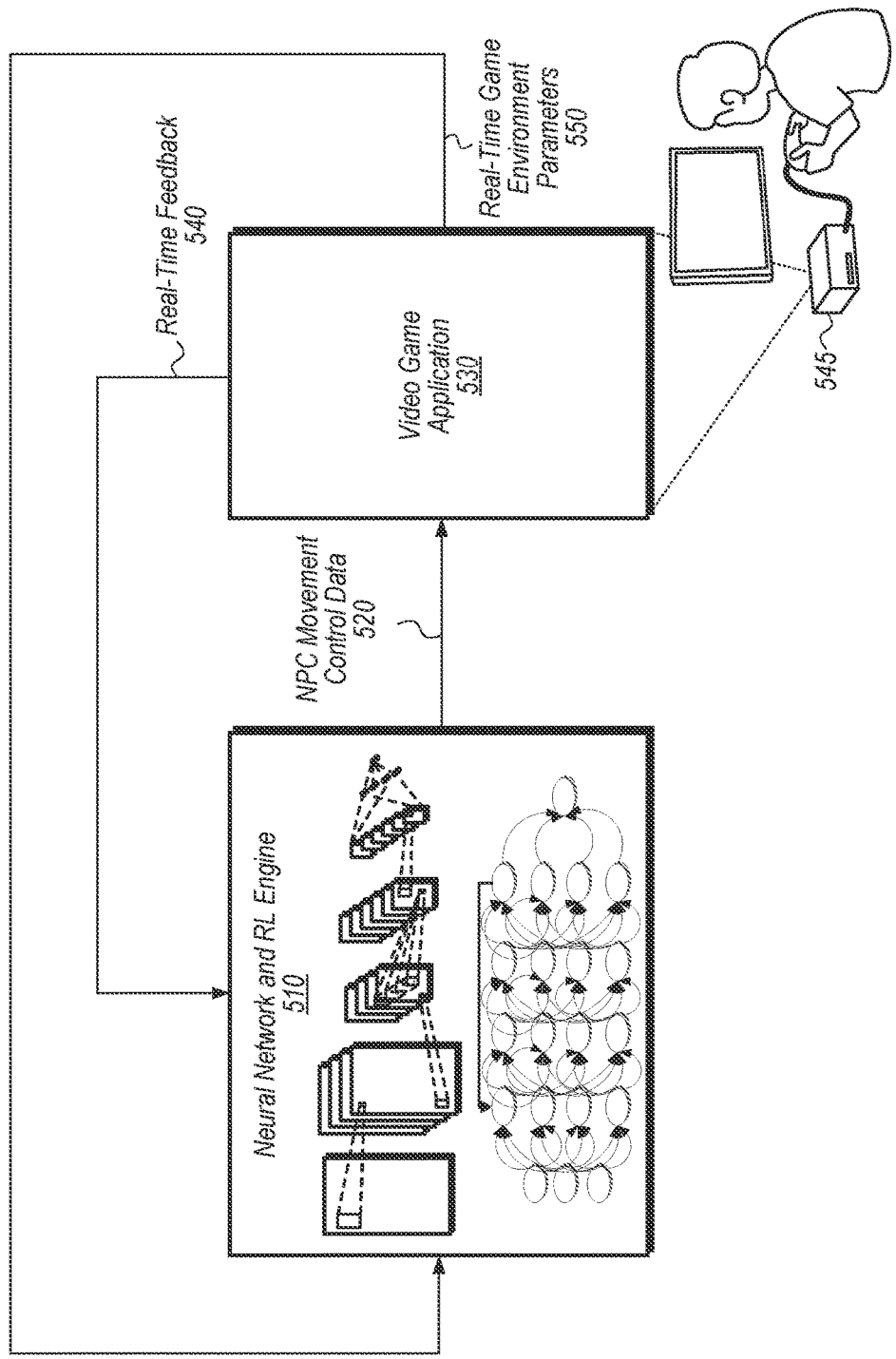
FIG. 5 is a block diagram of one implementation of an NPC movement generation neural network training system.

Referring now to FIG. 5, a block diagram of one implementation of an NPC movement generation neural network training system 500 is shown. System 500 represents a real-time use environment when a neural network and Reinforcement learning (RL) engine 510 has been deployed as part of a video game application 530 in the field to continue to adapt the weights of the layers of neural network and RL engine 510 to improve the movements of NPCs. These updated weights can be uploaded to the cloud to allow these updates to be applied to other neural networks. Accordingly, after neural network and RL engine 510 has been deployed, incremental training can continue so as to refine the characteristics of neural network and RL engine 510. This allows neural network and RL engine 510 to improve the generation of NPC movement control data 520 so as to enhance the overall user experience.

In one implementation, neural network and RL engine 510 receives real-time game environment parameters 550 as inputs. Real-time game environment parameters 550 are those parameters, such as player and NPC locations, vector projections, distance calculations, and so on, collected in real-time during gameplay of the video game application 530 by a user. Neural network and RL engine 510 uses real-time environment parameters 550 as inputs to the layers of neural network and RL engine 510 so as to generate NPC movement control data 520. NPC movement control data 520 is then provided to video game application 530 to control the movement of an NPC which is rendered and displayed to the user. While the user is playing the video game, the real-time environment parameters 550 will be captured, such as the movement of the player, the movement of other NPCs controlled by other neural networks, the context of the game, and so on.

In one implementation, video game application 530 executes on a game console 545. Game console 545 includes any of the components shown in system 100 (of FIG. 1) as well as other components not shown in system 100. In another implementation, video game application 530 executes in the cloud as part of a cloud gaming scenario. In a further implementation, video game application 530 executes in a hybrid environment that uses a game console 545 as well as some functionality in the cloud. Any of the other components shown in FIG. 5 can be implemented locally on the game console 545 or other computer hardware local to the user and/or one or more of these components can be implemented in the cloud.

Real-time feedback 540 is used to incrementally train neural network and RL engine 510 after deployment by an end-user. In one implementation, real-time feedback 540 is processed to generate a feedback score that is provided to neural network and RL engine 510. The higher the feedback score, the higher the positive feedback that is provided to neural network and RL engine 510 to indicate that neural network and RL engine 510 generated appropriate NPC movement control data 520. Also, in this implementation, the lower the feedback score, the more negative feedback that is provided to neural network and RL engine 510 to indicate that neural network and RL engine 510 did a poor job in generating NPC movement control data 520. This feedback, either positive or negative, which can vary throughout the time the user is playing video game application 530, will enable neural network and RL engine 510 to continue its training and perform better in future iterations when dynamically generating NPC movement control data 520. In one implementation, the learning rate of neural network and RL engine 510 is held within a programmable range to avoid making overly aggressive changes to the trained parameters in the field. The learning rate is a variable scale factor which adjusts the amount of change that is applied to the trained parameters during these incremental training passes.

Neural network and RL engine 510 can have different settings for different scenes, for different video games, for different players/users, and these settings can be pre-loaded based on which video game the user is playing, the current scene in the game, the context of the scene, and so on. Neural network and RL engine 510 can have any number of different sets of parameters for an individual game and these can be loaded and programmed into the layers in real-time as different phases of the game are encountered. Each set of parameters is trained based on real-time feedback 540 received during the corresponding part of the game independently from how the other sets of parameters are trained in their respective parts of the game.

Figure 6:
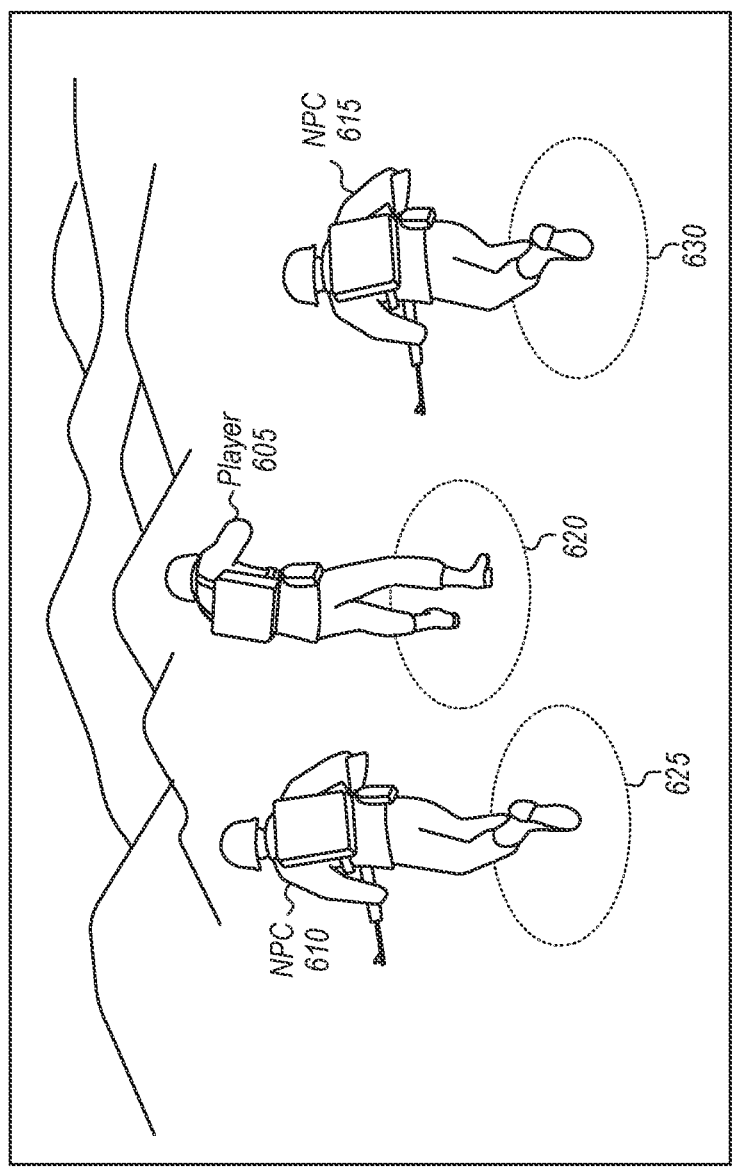
FIG. 6 is a diagram of one implementation of a user interface (UI) with NPCs.

Turning now to FIG. 6, a diagram of one example of a user interface (UI) 600 with NPCs is shown. In one implementation, UI 600 is rendered for a video game application, with UI 600 including a player 605. In this implementation, two NPCs 610 and 615 are rendered within the UI to follow the player by complying with movement schemes generated by corresponding machine learning engines (e.g., trained neural networks). In other words, a first machine learning engine controls the movements of NPC 610 to comply with a first movement scheme, and a second machine learning engine controls the movements of NPC 615 to comply with a second movement scheme.

In one implementation, the first and second machine learning engines generate the first and second movement schemes, respectively, that are based on respecting multiple measures of personal space associated with multiple agents operating within the video game. For example, a first measure of personal space is used to define region 620 shown encompassing player 605, with region 620 being a circle having a radius equal to the first measure of personal space. Alternatively, in another implementation, region 620 could be defined as other shapes having dimensions that are based at least in part on the first measure of personal space. As player 605 moves during gameplay, the location of region 620 will be updated in accordance with the movement of player 605. Similarly, a second measure of personal space is used to delineate region 625 for NPC 610, with region 625 being a circle with a radius equal to the second measure of personal space. Also, a third measure of personal space defines region 630 for NPC 615, with region 630 a circle having a radius equal to the third measure of personal space.

During gameplay, the movements of player 605, NPC 610, and NPC 615 are tracked. If NPC 610 violates the personal space of player 605 by entering region 620 or if NPC 610 violates the personal space of NPC 615 by entering region 630, then points are deducted from a score maintained for NPC 610. Similarly, if NPC 615 violates the personal space of player 605 or if NPC 615 violates the personal space of NPC 610, then points are deducted from a score maintained for NPC 615. After some amount of time has elapsed, the scores for NPC 610 and 615 are used to retrain their corresponding machine learning engines which control their movements. This retraining can occur offline to update future iterations of the machine learning engines, or the retraining can occur in real-time to update the machine learning engines as the game is being played. In another implementation, the user or a human judge provides feedback which affects the scores maintained for the machine learning engines controlling NPCs 610 and 615.

In one implementation, a control circuit (e.g., personal space distance measurement unit 430 of FIG. 4) accesses the game dynamics during gameplay via an API. In this implementation, the control circuit will determine if there are any other NPCs close to NPCs 610 and 615 using the API. Accessing the game dynamics via the API, the control circuit measures the distance between NPCs 610 and 615. In one implementation, the measured distance between NPCs 610 and 615 and player 605 are inputs to an evaluation engine. The measurements can be taken in different time steps, in different locations, and considering different situations. In one implementation, the measured distances are weighted based on the location and situation of the gameplay. In other words, some locations and situations are more important than others. Depending on the embodiment, the measurement values can be recorded per NPC, the measurement values can be combined for all NPCs, or the measurement values can be tracked per NPC category.

In another implementation, the control circuit does not have access to game dynamics, in which case the control circuit uses an object detection mechanism or a semantic segmentation mechanism to detect NPCs 610 and 615. Any of various classical or machine learning (ML) approaches can be used with these mechanisms. After detecting NPCs 610 and 615, the next step for the control circuit is measuring the distances between NPCs 610 and 615 and player 605 which can be done using different traditional image processing metrics or machine learning-based pipelines for evaluating depth perception.

Figure 7:
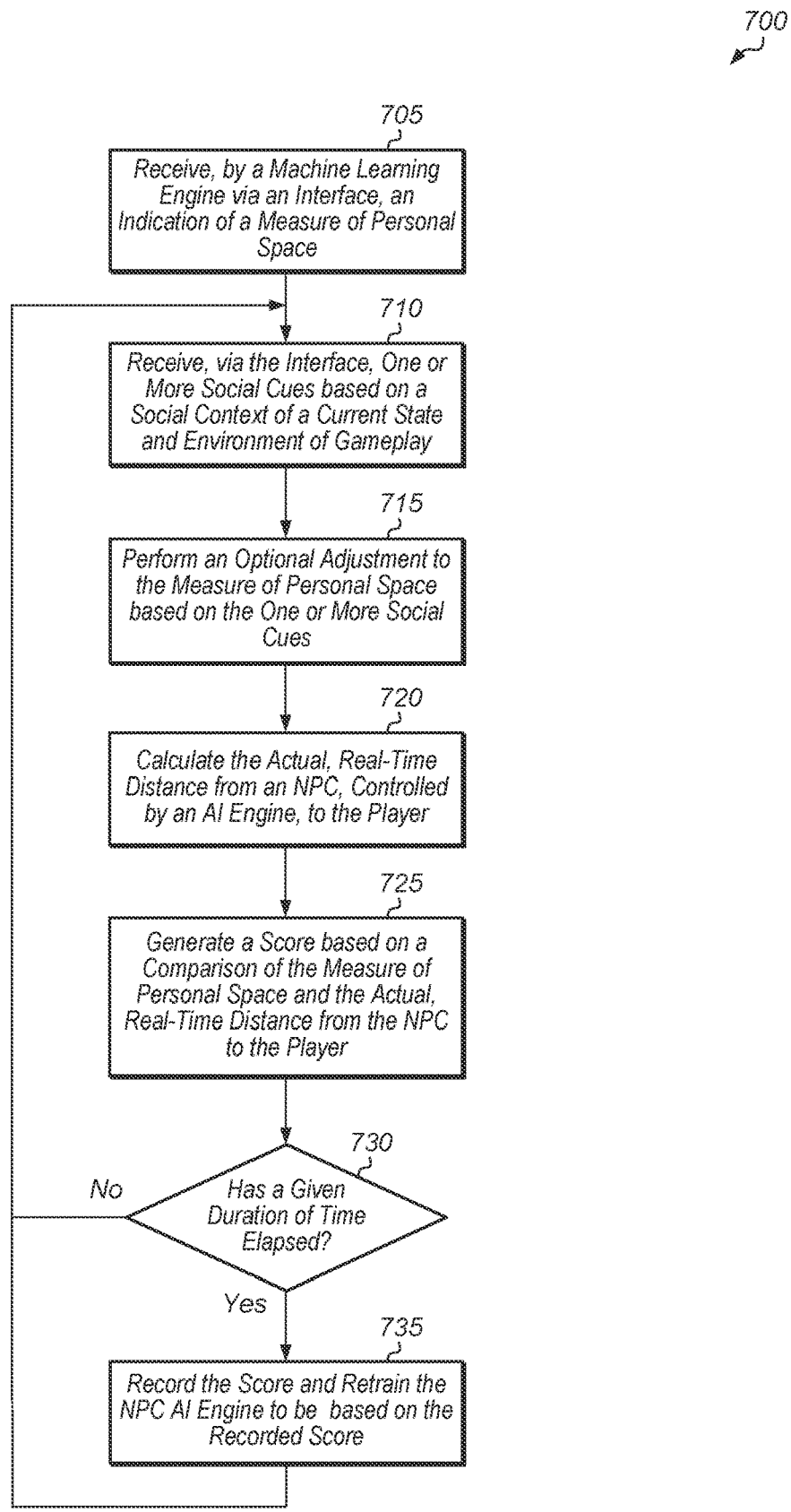
FIG. 7 is a generalized flow diagram illustrating one implementation of a method for detecting personal-space violations in artificial intelligence (AI)-based non-player characters (NPCs).
Figure 8:
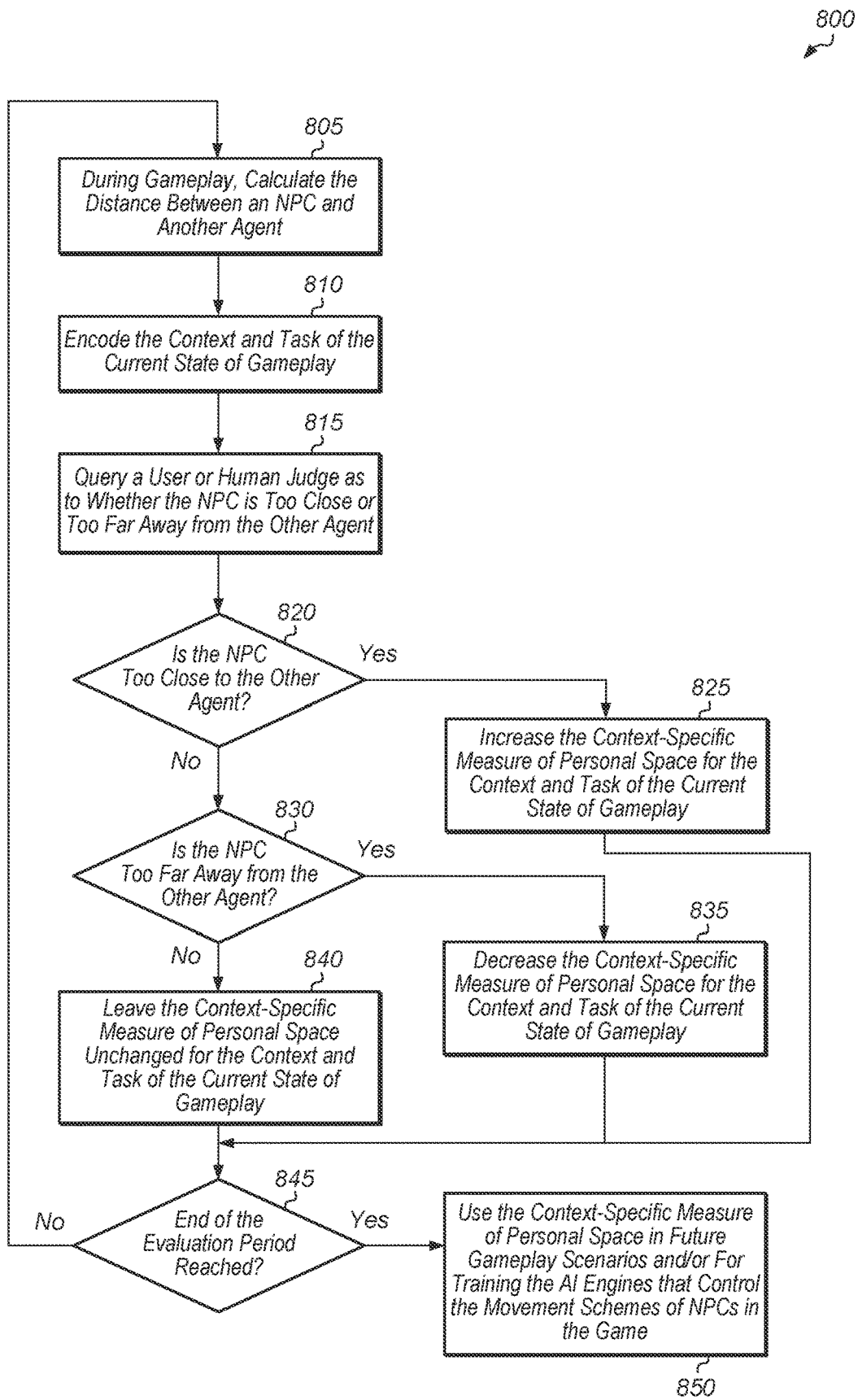
FIG. 8 is a generalized flow diagram illustrating one implementation of a method for adjusting measures of personal space in artificial intelligence (AI) based non-player characters (NPCs).
Figure 9:
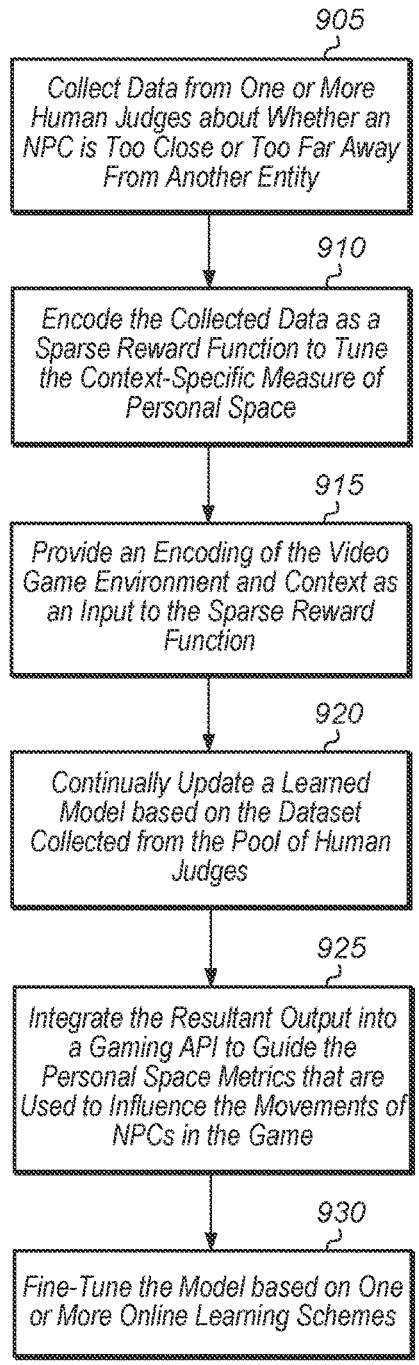
FIG. 9 is a generalized flow diagram illustrating one implementation of a method for employing a learned model to guide personal space metrics in a video game.
Figure 10:
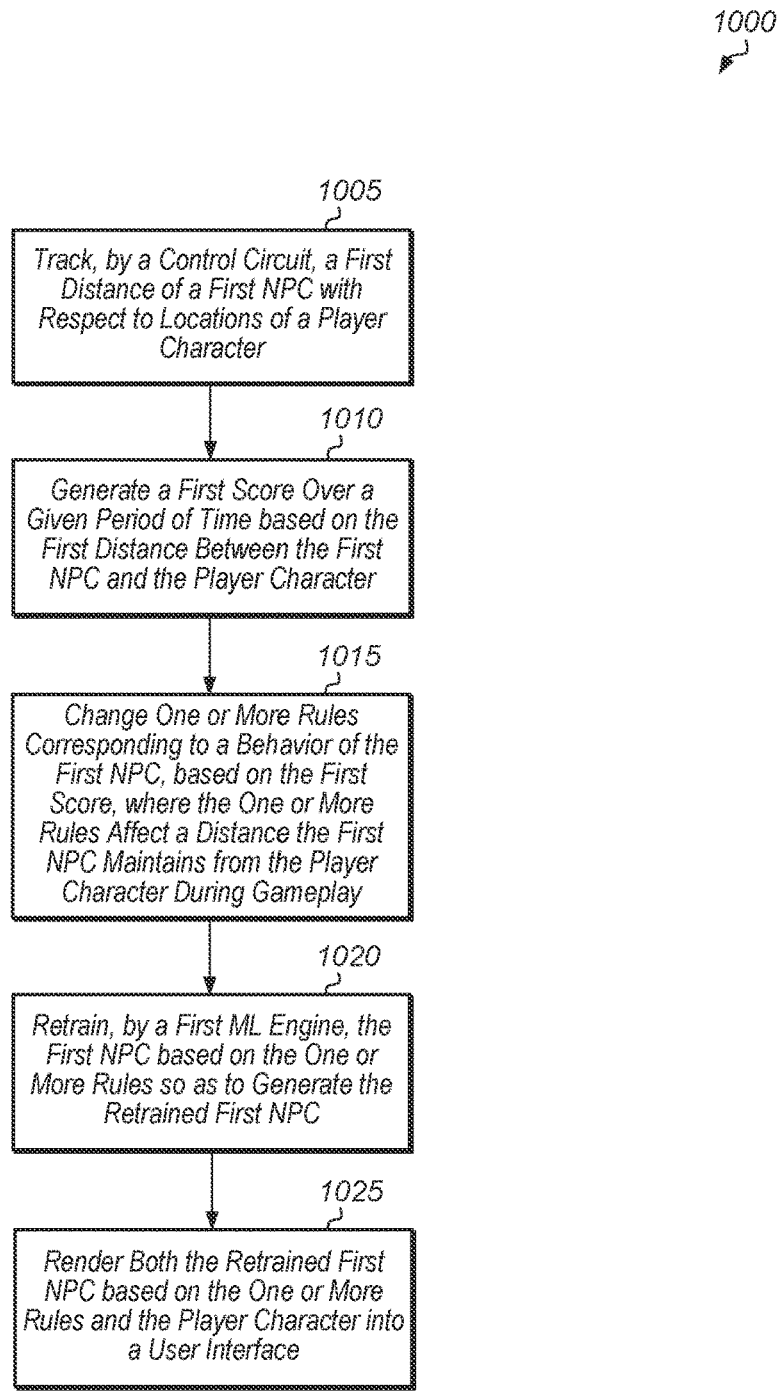
FIG. 10 is a generalized flow diagram illustrating one implementation of a method for retraining an NPC and rendering the retrained NPC.

Referring now to FIG. 7, one implementation of a method 700 for detecting personal-space violations in artificial intelligence (AI) based non-player characters (NPCs) shown. For purposes of discussion, the steps in this implementation and those of FIG. 8-10 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 700 (and methods 800-1000 of FIG. 8-10).

A machine learning engine receives, via an interface, an indication of a measure of personal space (block 705). The machine learning engine also receives, via the interface, one or more social cues based on a social context of a current state and environment of gameplay (block 710). In one implementation, the social context is characterized by a given task within a given environment of the video game being played. The machine learning engine performs an optional adjustment to the measure of personal space based on the one or more social cues (block 715). This optional adjustment is based on the context-dependent nature of the measure of personal space. For example, in one implementation, if an NPC is following a player, then the context-specific measure of personal space is 4 units away, while if the NPC is fighting with a player, then the context-specific measure of personal space is 1 unit away. Other scenarios can have other numbers of units as the context-specific measure of personal space.

On some interval, the machine learning engine calculates the actual, real-time distance from an NPC, controlled by an AI engine, to the player (block 720). Depending on the implementation, the Euclidean distance, the Geodesic distance, the Manhattan distance, or another type of distance is measured between the NPC and the player. Next, the machine learning engine generates a score based on a comparison of the measure of personal space and the actual, real-time distance from the NPC to the player (block 725). For example, in one implementation, if the real-time distance is greater than or equal to the measure of personal space, the machine learning engine increments the score. In this implementation, if the real-time distance is less than the measure of personal space, then the machine learning engine decrements the score. In other implementations, the machine learning engine uses other techniques to generate the score.

If a given duration of time has elapsed (conditional block 730, "yes" leg), then the machine learning engine records the score and retrains the NPC AI engine based on the recorded score (block 735). After block 735, method 700 returns to block 710. Otherwise, if the given duration of time has not elapsed (conditional block 730, "no" leg), then method 700 returns to block 710.

Turning now to FIG. 8, one implementation of a method 800 for adjusting measures of personal space in artificial intelligence (AI) based non-player characters (NPCs) shown. During gameplay, the distance between an NPC and another agent (e.g., another NPC, the player) is calculated (block 805). Also, the context and task of the current state of gameplay is encoded (block 810). In one implementation, the current state of gameplay is encoded as a one-hot vector. In other implementations, other types of encodings can be employed.

Next, a user or a human judge is queried as to whether the NPC is too close to or too far away from the other agent (block 815). If the user or human judge responds that the NPC is too close to the other agent (conditional block 820, "yes" leg), then the context-specific measure of personal space is increased for the context and task of the current state of gameplay (block 825). If the user or human judge responds that the NPC is too far away from the other agent (conditional block 830, "yes" leg), then the context-specific measure of personal space is decreased for the context and task of the current state of gameplay (block 835). Otherwise, if the user or human judge responds that the NPC is not too far away from the other agent (conditional block 830, "no" leg), then the context-specific measure of personal space is left unchanged for the context and task of the current state of gameplay (block 840).

After blocks 825, 835, and 840, if the end of the evaluation period has been reached (conditional block 845, "yes" leg), then the context-specific measures of personal space are used in future contexts of the game and/or for training the AI engines that control the movement schemes of NPCs in the game (block 850). After block 850, method 800 ends. Otherwise, if the end of the evaluation period has not been reached (conditional block 845, "no" leg), then method 800 returns to block 805.

Referring now to FIG. 9, one implementation of a method 900 for employing a learned model to guide personal space metrics in a video game is shown. During gameplay, or simulated gameplay, data is collected from one or more human judges about whether an NPC is too close or too far from away another entity (block 905). The collected data is encoded as a sparse reward function to tune the context-specific measure of personal space (block 910). For example, −1 is encoded if a judge deems that the artificial agent is too close or too far and 0 is encoded if the judge deems otherwise. In other implementations, other values can be encoded based on the feedback from each judge. Also, an encoding of the video game environment and context is provided as an input to the sparse reward function (block 915). Next, a learned model (e.g., deep learning model, machine learning model, statistics-based model) is continually updated based on the dataset collected from the pool of human judges (block 920). Then, the resultant output is integrated into a gaming API to guide the personal space metrics that are used to influence the movements of NPCs in the game (block 925). Also, the model is fine-tuned based on one or more online learning schemes (block 930). After block 930, method 900 ends.

Turning now to FIG. 10, one implementation of a method 1000 for retraining an NPC and rendering the retrained NPC is shown. A control circuit (e.g., personal space distance measurement unit 430 of FIG. 4) tracks a first distance of a first non-player character (NPC) with respect to locations of a player character (block 1005). The term "player character" refers to a main player in a video game, a character that is the focus of attention in the current video game scene, the player controlled by a user playing the video game, or the player controlled by an AI engine playing the video game. The control circuit generates a first score over a given period of time based on the first distance between the first NPC and the player character (block 1010). Next, the control circuit changes one or more rules corresponding to a behavior of the first NPC, based on the first score, where the one or more rules affect a distance the first NPC maintains from the player character during gameplay (block 1015). Then, a first machine learning (ML) engine (e.g., neural network and RL engine 510) retrains the first NPC based on the one or more rules so as to generate the retrained first NPC (block 1020). Next, a rendering engine (e.g., rendering engine 115 of FIG. 1) renders both the retrained first NPC based on the one or more rules and the player character into a user interface (UI) (e.g., UI 600 of FIG. 6) (block 1025). After block 1025, method 1000 ends. It is noted that method 1000 can be performed more than once so as to periodically retrain the first NPC.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
a control circuit configured to:
receive data corresponding to gameplay in a video game application executing in a computing system, the data including an indication of a location of a player character and a location of a first non-player character (NPC) during the gameplay;
receive input from a user, via an input interface, to control the location of the player character within the gameplay;
calculate a first distance of the first NPC with respect to locations of the player character during the gameplay;
generate a first score over a given period of time based on data corresponding to the first distance between the first NPC and the player character;
change one or more weights associated with a machine learning engine, based on the first score, wherein the machine learning engine controls a distance the first NPC maintains from the player character during gameplay; and
a rendering circuit configured to render data, for display on a display device, of both the first NPC and the player character.

2. The apparatus as recited in claim 1, wherein the control circuit is further configured to receive feedback data from the user regarding a distance of the first NPC to the player character during gameplay.

3. The apparatus as recited in claim 1, wherein the control circuit is further configured to:
determine a first measure of personal space associated with the player character;
modify the first measure of personal space based on a social cue so as to generate a second measure of personal space associated with the player character, wherein the social cue is based on a current scene of a video game application; and
generate the first score based on whether locations of the first NPC violate the second measure of personal space associated with the player character.

4. The apparatus as recited in claim 3, wherein the control circuit is further configured to:
calculate the first distance between the first NPC and the player character; and
compare the first distance to the second measure of personal space.

5. The apparatus as recited in claim 4, wherein the control circuit is further configured to:
increment the first score if the first distance is greater than or equal to the second measure of personal space; and
decrement the first score if the first distance is less than the second measure of personal space.

6. The apparatus as recited in claim 5, wherein the control circuit is further configured to:
calculate a second distance between the first NPC and a second NPC;
compare the second distance to a third measure of personal space associated with the second NPC;
increment a second score if the second distance is greater than or equal to the third measure of personal space; and
decrement the second score if the second distance is less than the third measure of personal space.

7. The apparatus as recited in claim 2, wherein the feedback data is encoded as a sparse reward function.

8. A method comprising:
receiving, by a control circuit, data corresponding to gameplay in a video game application executing in a computing system, the data including an indication of a location of a player character and a location of a first non-player character (NPC) during the gameplay;
receiving, via an input interface, input from a user to control the location of the player character within the gameplay;
calculating, by the control circuit, a first distance of the first NPC with respect to locations of the player character during the gameplay, wherein one or more rules affect a distance the first NPC maintains with respect to the player character during gameplay;
generating a first score over a given period of time based on the first distance between the first NPC and the player character, based on the received data;
changing one or more weights associated with a machine learning engine, based on the first score, wherein the machine learning engine controls a distance the first NPC maintains from the player character during gameplay; and
rendering, by a rendering circuit, both the first NPC based and the player character.

9. The method as recited in claim 8, further comprising receiving feedback data from the user regarding a distance of the first NPC to the player character during gameplay.

10. The method as recited in claim 8, further comprising:
determining a first measure of personal space associated with the player character controlled by a user;
modifying the first measure of personal space based on a social cue so as to generate a second measure of personal space associated with the player character, wherein the social cue is based on a current scene of a video game application; and
generating the first score based on whether locations of the first NPC violate the second measure of personal space associated with the player character.

11. The method as recited in claim 10, further comprising:
calculating the first distance between the first NPC and the player character; and
comparing the first distance to the second measure of personal space.

12. The method as recited in claim 11, further comprising:
incrementing the first score if the first distance is greater than or equal to the second measure of personal space; and
decrementing the first score if the first distance is less than the second measure of personal space.

13. The method as recited in claim 12, further comprising:
calculating a second distance between the first NPC and a second NPC;
comparing the second distance to a third measure of personal space associated with the second NPC;
incrementing a second score if the second distance is greater than or equal to the third measure of personal space; and
decrementing the second score if the second distance is less than the third measure of personal space.

14. The method as recited in claim 9, wherein the feedback data is encoded as a sparse reward function.

15. A system comprising:
a control circuit configured to:
receive data corresponding to gameplay in a video game application executing in a computing system, the data including an indication of a location of a player character and a location of a first non-player character (NPC) during the gameplay;
receive input from a user, via an input interface, to control the location of the player character within the gameplay;
calculate a first distance of the first NPC with respect to locations of the player character during the gameplay, wherein one or more rules affect a distance the first NPC maintains with respect to the player character during gameplay;
change one or more weights associated with a machine learning engine, based at least in part on the input from the user; and
wherein the machine learning (ML) engine is configured to alter a distance the first NPC maintains with respect to the player character during gameplay, responsive to the change in the one or more weights.

16. The system as recited in claim 15, wherein the control circuit is further configured to:
determine a first measure of personal space associated with the player character controlled by a user;
modify the first measure of personal space based on a social cue so as to generate a second measure of personal space associated with the player character, wherein the social cue is based on a current scene of a video game application; and
generate a first score based on whether locations of the first NPC violate the second measure of personal space associated with the player character.

17. The system as recited in claim 16, wherein the control circuit is further configured to:
calculate the first distance between the first NPC and the player character; and
compare the first distance to the second measure of personal space.

18. The system as recited in claim 17, wherein the control circuit is further configured to:
increment the first score if the first distance is greater than or equal to the second measure of personal space; and
decrement the first score if the first distance is less than the second measure of personal space.

19. The system as recited in claim 18, wherein the control circuit is further configured to:
calculate a second distance between the first NPC and a second NPC;
compare the second distance to a third measure of personal space associated with the second NPC;
increment a second score if the second distance is greater than or equal to the third measure of personal space; and
decrement the second score if the second distance is less than the third measure of personal space.

20. The system as recited in claim 15, wherein the input from the user is encoded as a sparse reward function.

* * * * *